(12) United States Patent
Wang et al.

(10) Patent No.: US 10,198,421 B2
(45) Date of Patent: Feb. 5, 2019

(54) METHOD FOR INSERTING OR DELETING CELLS, ROWS OR COLUMNS IN SPREADSHEET AND A DEVICE THEREFOR

(71) Applicants: ZHUHAI KINGSOFT OFFICE SOFTWARE CO., LTD, Zhuhai (CN); Beijing Kingsoft Office Software, Inc, Beijing (CN)

(72) Inventors: Hui Wang, Zhuhai (CN); Sijie Zeng, Zhuhai (CN); Wei Zhao, Zhuhai (CN)

(73) Assignees: ZHUHAI KINGSOFT OFFICE SOFTWARE CO., LTD, Zhuhai (CN); BEIJING KINGSOFT OFFICE SOFTWARE, INC, Beijing (CN)

( * ) Notice: Subject to any disclaimer, the term of this patent is extended or adjusted under 35 U.S.C. 154(b) by 467 days.

(21) Appl. No.: 14/531,961

(22) PCT Filed: Apr. 15, 2013

(86) PCT No.: PCT/CN2013/074201
§ 371 (c)(1),
(2) Date: Nov. 3, 2014

(87) PCT Pub. No.: WO2013/163920
PCT Pub. Date: Nov. 7, 2013

(65) Prior Publication Data
US 2015/0161095 A1 Jun. 11, 2015

(30) Foreign Application Priority Data

May 4, 2012 (CN) .......................... 2012 1 0138978

(51) Int. Cl.
*G06F 17/00* (2006.01)
*G06F 17/24* (2006.01)

(52) U.S. Cl.
CPC .. *G06F 17/246* (2013.01); *G06F 2203/04808* (2013.01)

(58) Field of Classification Search
None
See application file for complete search history.

(56) References Cited

U.S. PATENT DOCUMENTS 7,496,837 B1 2/2009 Larcheveque et al.
2008/0155075 A1* 6/2008 Cromer ................. G06F 9/4416
709/222

(Continued)

FOREIGN PATENT DOCUMENTS

| CN | 101689179 A | 3/2010 |
|---|---|---|
| CN | 102637118 A | 8/2012 |
| JP | 2006-72628 | 3/2006 |

OTHER PUBLICATIONS

International Search Report for PCT/CN2013/074201.

*Primary Examiner* — Mustafa A Amin
(74) *Attorney, Agent, or Firm* — Patterson & Sheridan, LLP; Steven Versteeg

(57) ABSTRACT

Disclosed is a method for inserting or deleting cells, rows or columns in a spreadsheet, comprising: obtaining touch and click information on a touch screen; determining target cells or target rows or columns; obtaining moving information about a touch point on the touch screen; according to a preset logic for judging operation type, judging that the operation to be performed is an insertion operation or a deletion operation; and determining locations and number of cells, rows or columns to be inserted or deleted, and performing an insertion or deletion operation. In addition, also disclosed is a device for inserting or deleting cells, rows or columns in a spreadsheet, including: an information acquisition module, a target determination module, an operation type judgment module and an operation execution module. The method and (Continued)

device in the present invention can simplify the operation in a spreadsheet in a gesture identification manner, to quickly and visually insert or delete cells, rows or columns, and increase efficiency.

9 Claims, 6 Drawing Sheets

(56) References Cited

U.S. PATENT DOCUMENTS

| | | | |
|---|---|---|---|
| 2011/0163968 A1* | 7/2011 | Hogan | G06F 3/04883 345/173 |
| 2012/0013540 A1 | 1/2012 | Hogan | |

* cited by examiner

METHOD FOR INSERTING OR DELETING CELLS, ROWS OR COLUMNS IN SPREADSHEET AND A DEVICE THEREFOR

TECHNICAL FIELD

The present invention relates to the technical field of spreadsheet operations in a touch screen device, and particularly to a method for inserting or deleting cells, rows or columns in a spreadsheet and a device therefor.

BACKGROUND ART

In a spreadsheet software in a touch screen device, insertion and deletion operations of cells, rows and columns belong to high-frequency operations. In a touch screen device, as the function of the spreadsheet software is enhanced and the function entry of a spreadsheet software increases, it is more complicated and difficult to conduct high-frequency operations such as insertion and deletion operations of cells, rows, and columns, and the like. For example, in the existing spreadsheet softwares, multi-step operations are required to complete the insertion and deletion of cells, rows and columns. Therefore, the current spreadsheet softwares which can run in a touch-screen device can not achieve quick and visual insertion and deletion of cells, rows and columns as in a traditional operation manner.

SUMMARY OF THE INVENTION

Technical Solutions

To solve the above mentioned problem, the present invention provides a method for inserting or deleting cells, rows or columns in a spreadsheet and a device for inserting or deleting cells, rows or columns in a spreadsheet.

The method for inserting or deleting cells, rows or columns in a spreadsheet includes the steps of:
  obtaining touch and click information on a touch screen;
  determining target cells or target rows or columns according to said touch and click information on the touch screen;
  obtaining moving information about a touch point on the touch screen;
  judging that the operation to be performed is an insertion operation or a deletion operation according to said moving information about the touch point on the touch screen and a preset logic for determining operation type; and
  determining locations and number of cells, rows or columns to be inserted or deleted according to the result of the above judging step and said moving information about the touch point on the touch screen, and performing corresponding insertion or deletion operation.

In comparison with conventional technologies, the method for inserting or deleting cells, rows or columns in a spreadsheet provided by the present invention simplifies the operations in a spreadsheet by touching, clicking and the movement of a touch point based on the characteristic that an object can be directly operated through the touch information on a touch screen device, achieving a quick and visual insertion and deletion of cells, rows and columns. Insertion and deletion operations to the objects in a spreadsheet can be performed more visually on a touch screen device through gesture recognition, so the efficiency is improved.

In addition, also disclosed is a device for inserting or deleting cells, rows or columns in a spreadsheet, which comprises an information acquisition module, a target determination module, an operation type judgment module and an operation execution module;

the information acquisition module is used to obtain touch and click information and moving information about a touch point on a touch screen;

the target determination module is used to determine target cells or target rows or columns according to said touch and click information on the touch screen;

the operation type judgment module is used to judge that an operation to be performed is an insertion operation or a deletion operation according to said moving information about the touch point on the touch screen and a preset logic for determining operation type; and the operation execution module is used to determine locations and number of cells, rows or columns to be inserted or deleted according to the judgment result from the operation type judgment module and said moving information about the touch point on the touch screen, and to perform corresponding insertion or deletion operation.

Beneficial Effects

In comparison with conventional technologies, the device for inserting or deleting cells, rows or columns in a spreadsheet provided by the present invention simplifies operations in a spreadsheet by touching, clicking and the movement of the touch point based on the characteristic that an object can be directly operated through touch information on a touch screen device, achieving a quick and visual insertion and deletion of the cells, rows and columns. Insertion and deletion operations to objects in a spreadsheet can be performed more visually on a touch screen device through gesture recognition, which improves efficiency.

BRIEF DESCRIPTION OF THE DRAWINGS

FIG. 3 is a schematic diagram showing the effect of performing the deletion of a cell by a method for inserting or deleting cells, rows or columns in a spreadsheet according to the present invention;

FIG. 4 is a schematic diagram showing the effect of performing the deletion of a row by a method for inserting or deleting cells, rows or columns in a spreadsheet according to the present invention;

DESCRIPTION OF EMBODIMENTS

The technical solutions of the present invention will be described clearly and completely below in combination with the accompanying drawings and preferred embodiments, so as to further illustrate the technical means adopted and the effects achieved in the present invention.

Figure 1A:
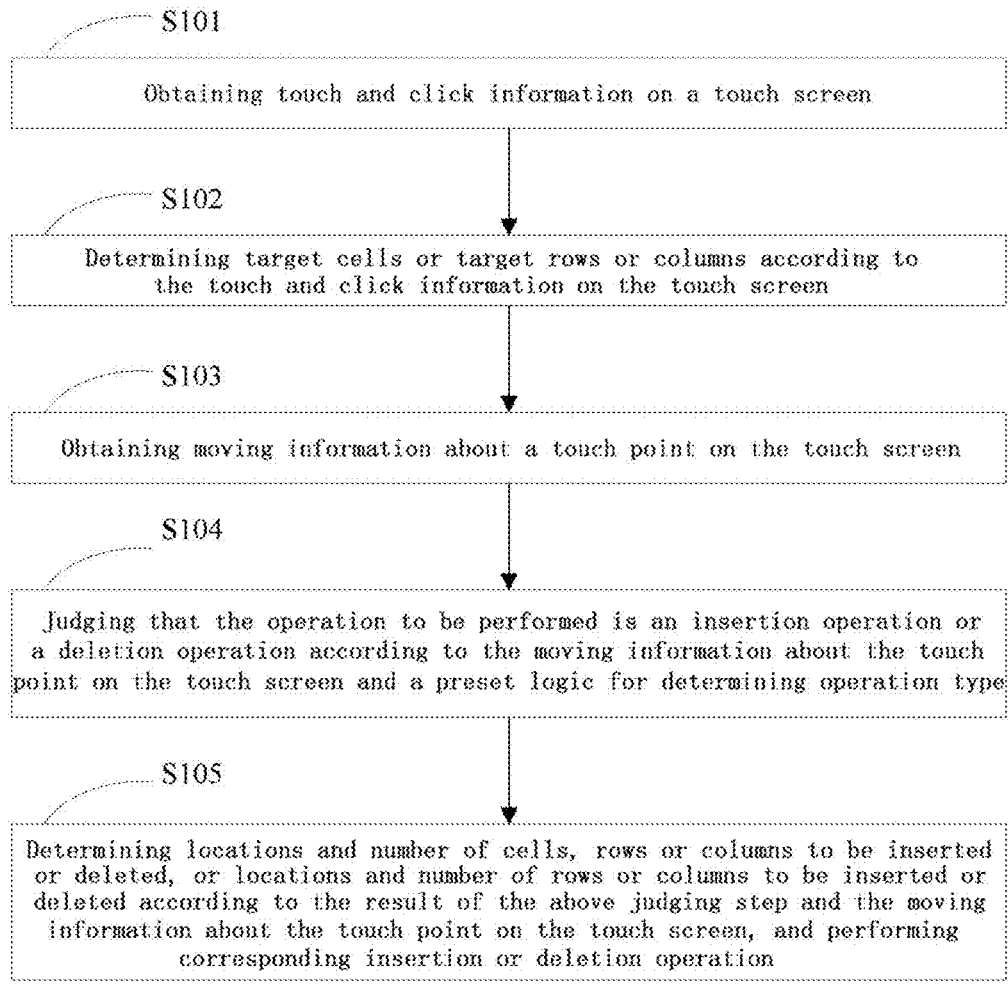
FIG. 1A is a schematic flow chart of a method for inserting or deleting cells, rows or columns in a spreadsheet according to the present invention.

Reference can be made to FIG. 1A, which is a schematic flow chart of a method for inserting or deleting cells, rows or columns in a spreadsheet according to the present invention. The method for inserting or deleting cells, rows or columns in a spreadsheet includes the steps of:

S101: obtaining touch and click information on a touch screen.

At first, it is needed to obtain touch and click information on a touch screen.

One example is to perform the insertion or deletion operations of cells, rows and columns in a spreadsheet on an ANDROID device. The basic click events on an ANDROID device are classified into a finger pressing down event ACTION_DOWN, a finger moving event ACTION_MOVE and a finger releasing event ACTION_UP. Handler is a mechanism responsible for sending and processing Message in an ANDROID system, which can be used to record and process touch and click events.

S102: determining target cells or target rows or columns according to said touch and click information on the touch screen.

Preferably, if a touch and click duration on the touch screen exceeds a preset duration, target cells or target rows or columns are determined according to touch and click locations on the touch screen.

As an example, the preset duration can be selected to be 500 ms.

Preferably, if the touch and click duration on the touch screen does not exceed the preset duration, the step of obtaining touch and click information on the touch screen is continued, and target cells or target rows or columns will be determined according to the touch and click locations not until the touch and click duration on the touch screen exceeds the preset duration.

Preferably, if more than one touch point is present on the touch screen, target rows or columns are determined according to the touch and click locations on the touch screen; or otherwise, the target cells are determined according to the touch and click locations on the touch screen.

To perform the insertion or deletion operations of cells, rows and columns in a spreadsheet on an ANDROID device is taken as an example. An ACTION_DOWN event will be generated when a single finger presses down on the touch screen of an ANDROID device. The system will send a LONG_PRESS Message of delaying 500ms to Handler when processing this event. If this Message is not removed within 500ms, the system will take this touch and click event as a single finger long press event. After 500ms, this Message will record the coordinate of the location where this event occurs, and determine target cells according to the touch and click location. If an ACTION_UP event or an ACTION_POINTER_DOWN event (a touch and press event by another finger) occurs, or an ACTION_MOVE event occurs during this 500ms, and the distance between the coordinate locations of the ACTION MOVE event and the ACTION_DOWN event exceeds a certain value (such as 16 pixels, which can be taken as a normal error range of finger shaking allowed in a touch screen mobile phone), the system will not take it as a long press event and will remove from Handler the LONG_PRESS Message previously sent. The system keeps on obtaining touch and click information on the touch screen, and will determine the target cells according to the touch and click locations not until the touch and click duration on the touch screen exceeds 500ms.

In an ANDROID device, when a plurality of fingers touch the screen, in addition to an ACTION_DOWN event generated when a first finger presses down and an ACNTION_UP event generated when a last finger releases, an ACTION_POINTER_DOWN event will be generated when other finger(s) press down, an ACTION_POINTER_UP event will be generated when the fingers release, and an ACTION_MOVE event will be generated when the fingers move. Locations of individual touch points can be respectively obtained from these events.

When an ACTION_POINTER_DOWN event is generated, whether it is a two-finger event can be judged according to the fact whether the return value from get PointerCount( ) of Motion Event is 2. If it is a two-finger event, the system will send a DBL_LONG_PRESS Message of delaying 500 ms to the Handler. Otherwise, the system will remove the DBL_LONG_PRESS Message within 500 ms. After 500 ms, the DBL_LONG_PRESS Message will record the coordinate locations where the touch and click event occurs, and determine target rows or columns according to the touch and click locations. If an ACTION_UP event, an ACTION_POINTER_DOWN event (i.e. touch and press down event by a third finger), an ACTION_POINTER_UP event, or an ACTION_MOVE event occurs during this 500 ms, and the distance between the coordination locations of either of the two touch points in the ACTION_MOVE event and the corresponding coordinate location recorded in the ACTION_DOWN event exceeds a certain value (such as 16 Pixels, which can be taken as a normal error range of finger shaking allowed in a touch screen mobile phone), the system will not take it as a two-finger long press event and will remove from Handler the LONG_PRESS Message previously sent. The system keeps on obtaining click information about a plurality of touch points on the touch screen, and will determine the target rows or columns according to touch and click locations not until the click duration of a plurality of touch points on the touch screen exceeds 500 ms.

S103: obtaining moving information about a touch point on the touch screen.

After determining the target cells or rows or columns, it is needed to obtain the moving information about the touch point on the touch screen.

One example is to perform the insertion or deletion operations of cells, rows and columns in a spreadsheet in an ANDROID device. For a single finger long press event, during the movement of the finger, there are two different insertion and deletion modes depending on the locations of the finger, which are respectively as follows: mode 1: the mode of inserting/deleting cells by moving downward/upward, i.e. inserting rows or row cells; and mode 2: the mode of inserting/deleting cells by moving rightward/leftward, i.e. inserting columns or column cells.

The mode can be switched between mode 1 and mode 2 according to the current location of the finger. The basic rules are as follows. If the current mode is mode 1, and the current vertical displacement is smaller than a certain rated value (such as 50 pixels) and the horizontal displacement from the original starting location is larger than the vertical displacement from the original starting location, the mode 1 is switched to mode 2. If the current mode is mode 2, and the current horizontal displacement is smaller than a certain rated value (such as 50 pixels) and the horizontal displacement from the original starting position is smaller than the vertical displacement from the original starting location, the mode 2 is switched to mode 1.

Figures 1B, 2:
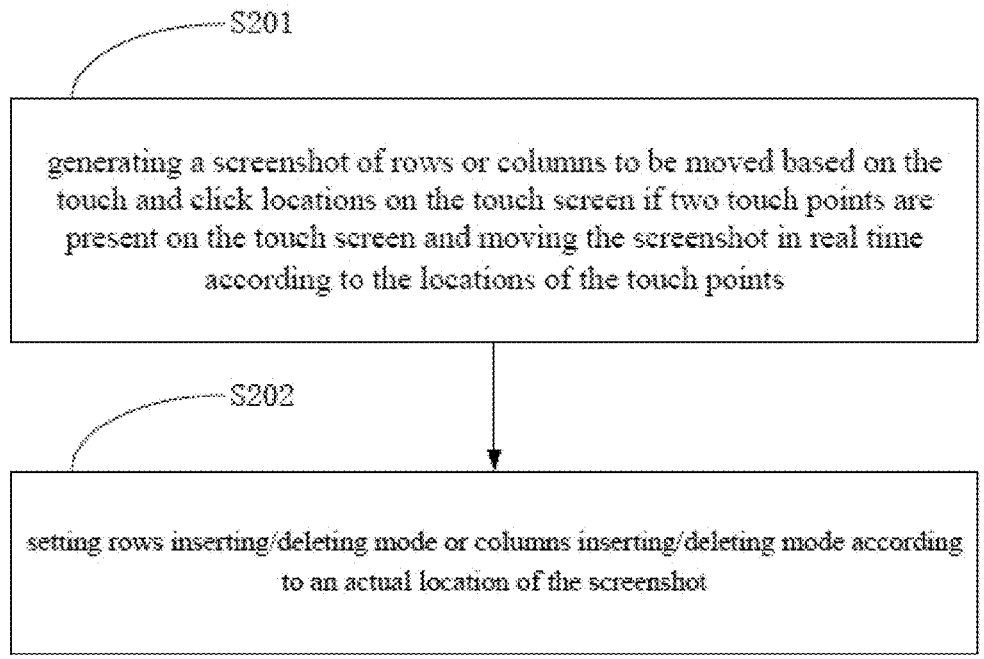
FIG. 1B is another schematic flow chart of operations included in the method for inserting or deleting cells, rows or columns in a spreadsheet according to the present invention.
FIG. 2 is a schematic diagram showing the effect of performing the insertion of a cell by a method for inserting or deleting cells, rows or columns in a spreadsheet according to the present invention.

Reference to FIG. 1B, the determining target rows or columns of cells according to touch and click locations on the touch screen, when more than one touch point is present on the touch screen includes the steps of:

S201: generating a screenshot of rows or columns to be moved based on the touch and click locations on the touch screen if two touch points are present on the touch screen and moving the screenshot in real time according to the locations of the touch points; and S202: setting rows inserting/deleting mode or columns inserting/deleting mode according to an actual location of the screenshot.

Figure 7:
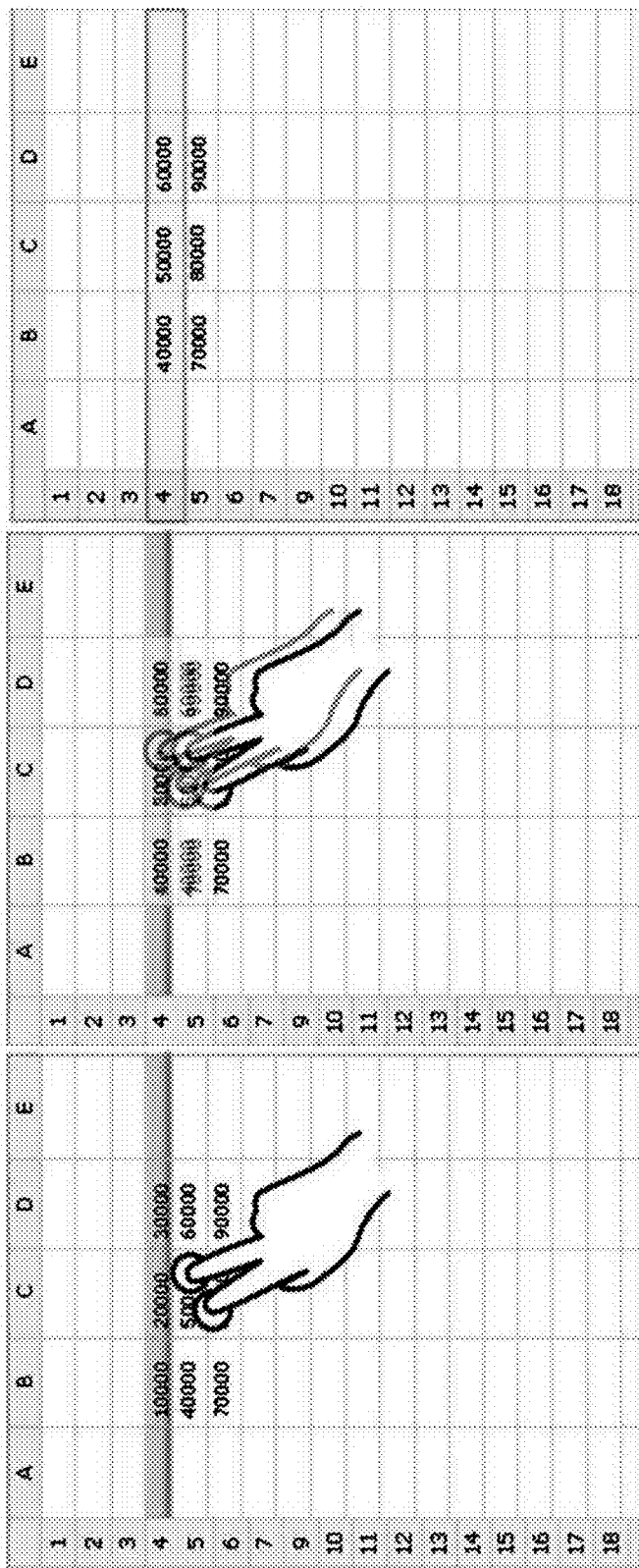
FIG. 7 is a schematic diagram showing the effect of generating a screenshot of rows to be moved based on the touch and click locations on the touch screen.
Figure 8:
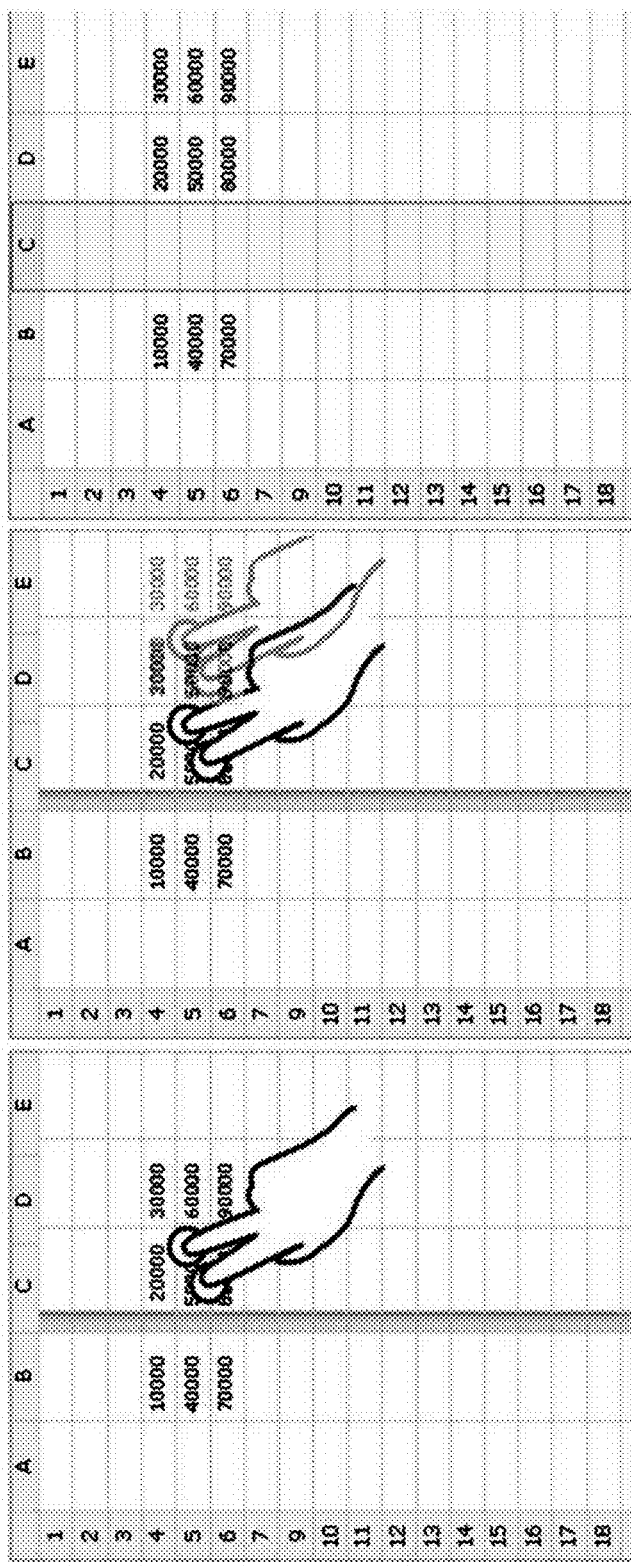
FIG. 8 is a schematic diagram showing the effect of generating a screenshot of columns to be moved based on the touch and click locations on the touch screen.

One example is to perform insertion or deletion operations of cells, rows and columns in a spreadsheet in an ANDROID device. As shown in FIGS. 7 and 8, for a two-finger long press event, a screenshot of rows or columns to be moved can be generated when the fingers move. The screenshot is moved in real time according to the locations of the fingers, and the location and movement of the screenshot can represent the location and movement of a touch point on the touch screen. For a two-finger touch event, during the movement of the fingers, two different insertion and deletion modes can be set according to the actual location of the screenshot: Mode 1and Mode 2. Mode 1 is rows inserting/deleting mode, in which only the vertical displacement of the fingers is calculated. Mode 2 is columns inserting/deleting mode, in which only the horizontal displacement of the fingers is calculated.

According to the current location of the screenshot, the mode can be switched between mode 1 and mode 2. The basic rules are as follows. if the current mode is mode 1, and the vertical displacement is smaller than a certain rated value (such as 50 pixels) when the location of the current screenshot is compared with the original location, the current locations of the two fingers are recorded and compared with subsequent ACTION_MOVE. If the result of the comparison shows that the gesture generates a horizontal displacement (larger than a certain rated value, such as 10 pixels), the mode 1 is switched to mode 2. If the current mode is mode 2, and the horizontal displacement is smaller than a certain rated value (such as 50 pixels) when the location of the current screenshot is compared with the original location, the current locations of the two fingers are recorded and compared with the subsequent ACTION_MOVE; and if the result of the comparison shows that the gesture generates a vertical displacement, the mode 2 is switched to mode 1.

In an ANDROID device, in comparison with the movement of a single finger, the moving distances of two fingers are calculated by the following rules. Only the vertical displacement is calculated in mode 1, and only the horizontal displacement is calculated in mode 2. If there is no obvious movement for both fingers (the displacement is less than 10 pixels), the moving information is ignored. If there is no obvious movement for one of the two fingers (the displacement is less than 10 pixels), only the moving distance of the other finger having a larger displacement is calculated. If the two fingers move simultaneously in the same moving direction, only the moving distance of the finger having a larger displacement is calculated. If the two fingers move simultaneously in different moving directions, the displacement difference is calculated as a final displacement.

In an ANDROID device, the moving information about touch point(s) on the touch screen can be obtained through the modes and the mode switching described above, no matter that a single touch point or a plurality of touch points present on the touch screen.

S104: judging that an operation to be performed is an insertion operation or a deletion operation according to said moving information about the touch point on the touch screen and a preset logic for determining operation type.

As one of the examples, the preset logic for determining operation type includes the steps of: judging the moving direction of the touch point on the touch screen according to said moving information about the touch point on the touch screen, and judging that the operation to be performed is an insertion operation or a deletion operation according to said moving direction of the touch point on the touch screen.

One example is to perform the insertion or deletion operations of cells, rows and columns in a spreadsheet in an ANDROID device. The moving direction of a touch point on a touch screen can be judged according to the moving information about the touch point on the touch screen obtained from step S103, and in turn it can be judged that an insertion operation or a deletion operation shall be performed.

Matching is made to the user habit for a spreadsheet in a computer. As one of the examples, the operation to be performed is judged to be an insertion operation if the moving direction of the touch point on a touch screen is judged to be rightward or downward; and the operation to be performed is judged to be a deletion operation if the moving direction of the touch point on a touch screen is judged to be leftward or upward.

S105: determining locations and number of cells to be inserted or deleted, or locations and number of rows or columns to be inserted or deleted according to the result of the above judging and the obtained moving information about the touch point on the touch screen, and performing corresponding insertion or deletion operation.

According to the judgment result in step S104 and the moving information about the touch point on the touch screen, in particular according to the displacement of the touch point, the locations and number of cells to be inserted or deleted or the locations and number of rows or columns to be inserted or deleted can be determined, and then corresponding insertion or deletion operation can be performed.

One example is to perform the insertion or deletion operations of cells, rows and columns in a spreadsheet in an ANDROID device. When there is a single finger long press event, an ACTION_UP event is generated when the finger releases. Then the locations and number of cells to be inserted or deleted are confirmed according to the moving information of the finger, and the data is modified to complete the operation. When there is a two fingers long press event, an ACTION_POINTER_UP event is generated when the fingers release. Then the locations and number of rows or columns to be inserted or deleted are confirmed according to the moving information of the fingers, and the data is modified to complete an operation. When it is a two-finger long press event, and one finger is still remained on the screen at this moment, this finger can be used to scroll the view area.

As one of the examples, after target rows or columns are determined according to said touch and click information on the touch screen, and the operation to be performed being an insertion operation or a deletion operation is judged according to said moving direction of the touch point on the touch screen, it can be judged to perform operations on rows or on columns by the following method.

If the moving direction of a touch point on a touch screen is upward or downward, the locations and number of the rows to be inserted or deleted are determined and corresponding insertion or deletion operation is performed; and If the moving direction of a touch point on a touch screen is leftward or rightward, the locations and number of the columns to be inserted or deleted are determined, and corresponding insertion or deletion operation is performed.

In comparison with conventional technologies, the method for inserting or deleting cells, rows or columns in a spreadsheet provided by the present invention simplifies the operations in a spreadsheet by touching, clicking and the movement of a touch point based on the characteristic that an object can be directly operated through touch information on a touch screen device, thus achieving a quick and visual insertion and deletion of cells, rows and columns. Insertion and deletion operations can be performed more visually on the objects in a spreadsheet on a touch screen device through gesture recognition, so the efficiency is improved.

Reference can be made to FIG. 2, which is a schematic diagram showing the effect of performing the insertion of a cell by a method for inserting or deleting cells, rows or columns in a spreadsheet according to the present invention.

A single finger clicks to select a cell, and the finger drags to the right to insert one cell on the left side of the selected cell. The finger releases to end the operation. A plurality of cells can also be inserted according to the dragging distance of the finger.

Figures 3, 4:
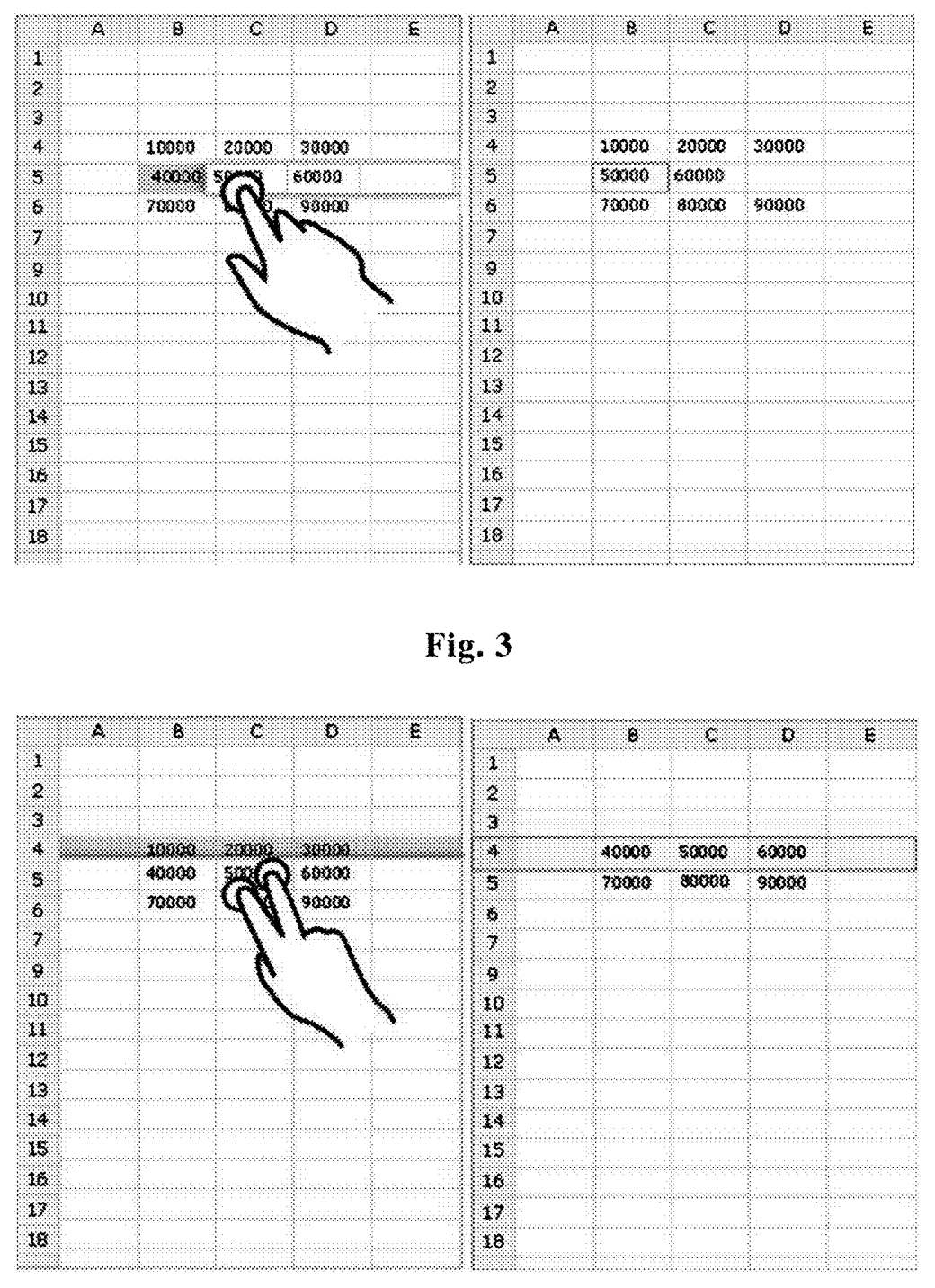

Reference can be made to FIG. 3, which is a schematic diagram showing the effect of performing the deletion of a cell by a method for inserting or deleting cells, rows or columns in a spreadsheet according to the present invention.

A single finger clicks to select a cell, and the finger drags to the left to delete one cell on the left side of the selected cell. The finger releases to end the operation. A plurality of cells can also be deleted according to the dragging distance of the finger.

Reference can be made to FIG. 4, which is a schematic diagram showing the effect of performing the deletion of a row by a method for inserting or deleting cells, rows or columns in a spreadsheet according to the present invention.

Two fingers click to select a row or a column, and the fingers drag upward to delete one row on the upper side of the selected row. The fingers release to end the operation. A plurality of rows can also be deleted according to the dragging distance of the fingers.

Figure 5:
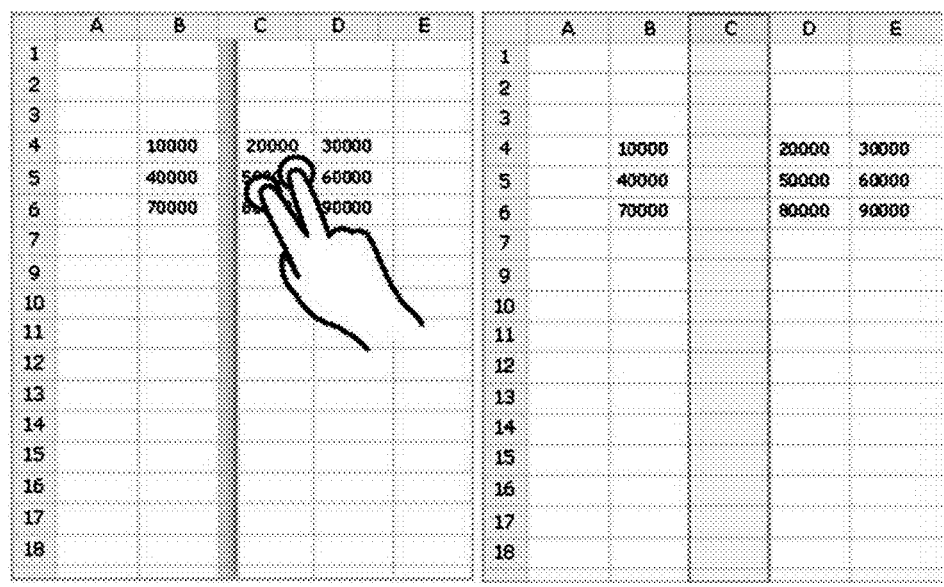
FIG. 5 is a schematic diagram showing the effect of performing the insertion of a column by a method for inserting or deleting cells, rows or columns in a spreadsheet according to the present invention.

Reference can be made to FIG. 5, which is a schematic diagram showing the effect of performing the insertion of a column by a method for inserting or deleting cells, rows or columns in a spreadsheet according to the present invention.

Two fingers click to select a row or a column, and the fingers drag to the right to insert one column on the left side of the selected column. The fingers release to end the operation. A plurality of columns can also be inserted according to the dragging distance of the fingers.

In addition, also disclosed is a device for inserting or deleting cells, rows or columns in a spreadsheet.

Figure 6:
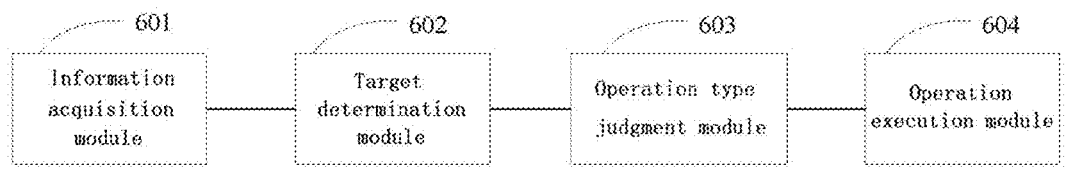
FIG. 6 is schematic structure diagram of a device for inserting or deleting cells, rows or columns in a spreadsheet according to the present invention.

Reference can be made to FIG. 6, which is schematic structure diagram of a device for inserting or deleting cells, rows or columns in a spreadsheet according to the present invention. The device for inserting or deleting cells, rows or columns in a spreadsheet according to the present invention includes an information acquisition module 601, a target determination module 602, an operation type judgment module 603 and an operation execution module 604.

The information acquisition module 601 is used to obtain touch and click information and moving information about a touch point on a touch screen;

The target determination module 602 is used to determine target cells or target rows or columns according to the touch and click information on the touch screen;

The target determination module 602 is further used to judge whether more than one touch point is present on the touch screen;

If more than one touch point is present on the touch screen, the target determination module 602 determines target rows or columns according to the touch and click information on the touch screen;

Otherwise, the target determination module 602 determines the target cells according to the location of the touch point on the touch screen.

The operation type judgment module 603 is used to judge that the operation to be performed is an insertion operation or a deletion operation according to the moving information about the touch point on the touch screen and a preset logic for determining operation type.

The operation type judgment module 603 is used to judge the moving direction of the touch point on a touch screen according to the moving information about the touch point on the touch screen; and to further judge that the operation to be performed is an insertion operation or a deletion operation according to the moving direction of the touch point on the touch screen.

The operation execution module 604 is used to determine the locations and number of cells to be inserted or deleted, or the locations and number of rows or columns to be inserted or deleted according to the judgment result from the operation type judgment module and the moving information about the touch point on the touch screen, and to perform corresponding insertion or deletion operation.

After the target determination module 602 determines target rows or columns according to the touch and click information on the touch screen, and the operation type judgment module 603 judges that the operation to be performed is an insertion operation or a deletion operation according to the moving direction of the touch point on the touch screen, if the moving direction of the touch point on the touch screen is upward or downward, the operation execution module 604 is used to determine the locations and number of the rows to be inserted or deleted, and to perform corresponding insertion or deletion operation; and if the moving direction of the touch point on the touch screen is leftward or rightward, the operation execution module 604 is used to determine the locations and number of the columns to be inserted or deleted, and to perform corresponding insertion or deletion operation.

In comparison with conventional technologies, the device for inserting or deleting cells, rows or columns in a spreadsheet provided by the present invention simplifies the operations in a spreadsheet by touching, clicking and the movement of a touch point based on the characteristic that an object can be directly operated through touch information on a touch screen device, thus achieving a quick and visual insertion and deletion of cells, rows and columns. Insertion and deletion operations can be performed more visually on the objects in a spreadsheet on a touch screen device through gesture recognition, which improves efficiency.

The embodiments described above illustrate only several implementations of the present invention, which are specifically described in detail. However, they should not be regarded as a limitation to the scope of the present invention. It should be noted that, for those skilled in the art, several variations and improvements can also be made to the present invention without departing from the concept of the present invention, which fall within the protection scope of the present invention. Therefore, the protection scope of the present invention shall be defined by the appended claims.

What is claimed is:

1. A method for inserting or deleting cells, rows or columns in a spreadsheet, characterized in that the method comprises the steps of:
   obtaining touch and click information of more than one touch points present on a touch screen;
   determining target rows or columns of cells according to touch and click locations on the touch screen;
   obtaining moving information about the touch points on the touch screen;
   judging that an operation to be performed is an insertion operation or a deletion operation according to said moving information about the touch points on the touch screen and a preset logic for determining operation type; and
   determining locations and number of rows or columns to be inserted or deleted according to a result of the judging step and a displacement of the touch points included in said moving information about the touch points on the touch screen, and performing said insertion or deletion operation,
   wherein determining target rows or columns of cells according to touch and click locations on the touch screen comprises:
   generating a screenshot of rows or columns to be moved based on the touch and click locations on the touch screen if two touch points are present on the touch screen and moving the screenshot in real time according to the locations of the touch points; and
   setting a first mode for inserting/deleting a row in which only a vertical displacement of fingers is calculated or a second mode for inserting/deleting a column in which only a horizontal displacement of the fingers is calculated according to an actual location of the screenshot,
   wherein the setting the first mode for inserting/deleting the row or the second mode for inserting/deleting the column according to an actual location of the screenshot comprises: in the case that a current mode is the first mode for inserting/deleting a row, in responding to the vertical displacement of the screenshot being smaller than a certain rated value and the horizontal displacement of the screenshot being larger than the certain rated value relative to a original location of the screenshot, switching the current mode to the second mode for inserting/deleting a column; and in the case that the current mode is the second mode for inserting/deleting a column, in responding to the vertical displacement of the screenshot being larger than the certain rated value and the horizontal displacement of the screenshot being smaller than the certain rated value relative to the original location of the screenshot, switching the current mode to the first mode for inserting/deleting the row.

2. The method for inserting or deleting cells, rows or columns in a spreadsheet according to claim 1, characterized in that, the step of determining target rows or columns includes the step of:
   determining target rows or columns according to touch and click locations on the touch screen, if a touch and click duration on the touch screen exceeds a preset duration.

3. The method for inserting or deleting cells, rows or columns in a spreadsheet according to claim 1, characterized in that, the preset logic for determining operation type comprises:
   judging the moving direction of the touch points on the touch screen according to said moving information about the touch point on the touch screen; and
   judging that the operation to be performed is an insertion operation or a deletion operation according to said moving direction of the touch points on the touch screen.

4. The method for inserting or deleting cells, rows or columns in a spreadsheet according to claim 3, characterized in that, judging that the operation to be performed is an insertion operation or a deletion operation according to said moving direction of the touch points on the touch screen comprises the steps of:
   judging that the operation to be performed is an insertion operation if said moving direction of the touch points on the touch screen is rightward or downward; and
   judging that the operation to be performed is a deletion operation if said moving direction of the touch points on the touch screen is leftward or upward.

5. The method for inserting or deleting cells, rows or columns in a spreadsheet according to claim 3, characterized in that, after the two steps of determining target rows or columns of cells according to said touch and click information on the touch screen and judging that the operation to be performed is an insertion operation or a deletion operation according to said moving direction of the touch points on the touch screen, the method comprises the steps of:
   determining the locations and number of the rows to be inserted or deleted and performing corresponding insertion or deletion operation if said moving direction of the touch points on the touch screen is upward or downward; and
   determining the locations and number of the columns to be inserted or deleted and performing corresponding insertion or deletion operation if said moving direction of the touch points on the touch screen is leftward or rightward.

6. A device comprising: a processor and a memory, wherein a plurality of executable modules including an information acquisition module, a target determination module, an operation type judgment module and an operation execution module are stored in the memory, which are executable by the processor to insert or delete cells, rows or columns in a spreadsheet; wherein,
   the information acquisition module is executed to obtain touch and click information and moving information about a touch point on a touch screen;
   the target determination module is executed to judge whether more than one touch point is present on the touch screen, wherein when only one touch point is present on the touch screen the target determination module is further executed to determine target cells according to said touch and click information on the touch screen, and when more than one touch point is present on the touch screen, the target determination module is executed to determine target rows or columns of cells according to touch and click locations on the touch screen;

the operation type judgment module is executed to judge that the operation to be performed is an insertion operation or a deletion operation according to said moving information about the touch point on the touch screen and a preset logic for determining operation type; and the operation execution module is executed to determine locations and number of cells to be inserted or deleted, or locations and number of rows or columns to be inserted or deleted according to a judgment result from the operation type judgment module and a displacement of the touch point included in said moving information about the touch point on the touch screen, and to perform corresponding insertion or deletion operation, and wherein the target determination module is further executed to:

generate a screenshot of rows or columns to be moved based on the touch and click locations on the touch screen when two touch points are present on the touch screen and move the screenshot in real time according to the locations of the touch points; and set a first mode for inserting/deleting a row in which only a vertical displacement of fingers is calculated or a second mode for inserting/deleting a column in which only a horizontal displacement of the fingers is calculated according to an actual location of the screenshot, wherein the target determination module is further executed to: in the case that a current mode is the first mode for inserting/deleting a row, in responding to the vertical displacement of the screenshot being smaller than a certain rated value and the horizontal displacement of the screenshot being larger than the certain rated value relative to a original location of the screenshot, switch the current mode to the second mode for inserting/deleting a column; and in the case that the current mode is the second mode for inserting/deleting a column, in responding to the vertical displacement of the screenshot being larger than the certain rated value and the horizontal displacement of the screenshot being smaller than the certain rated value relative to the original location of the screenshot, switch the current mode to the first mode for inserting/deleting the row.

7. The device according to claim 6, characterized in that, the operation type judgment module is used to judge a moving direction of the touch point on the touch screen according to said moving information about the touch point on the touch screen, and further to judge that the operation to be performed is an insertion operation or a deletion operation according to said moving direction of the touch point on the touch screen.

8. The device according to claim 7, characterized in that, after the target determination module is executed to determine target cells or target rows or columns of cells according to said touch and click information on the touch screen and the operation type judgment module is executed to judge that the operation to be performed is an insertion operation or a deletion operation according to said moving direction of the touch point on the touch screen, if said moving direction of the touch point on the touch screen is upward or downward, the operation execution module is executed to determine locations and number of the rows to be inserted or deleted, and perform corresponding insertion or deletion operation; or if said moving direction of the touch point on the touch screen is leftward or rightward, the operation execution module is executed to determine locations and number of the columns to be inserted or deleted, and perform corresponding insertion or deletion operation.

9. The method for inserting or deleting cells, rows or columns in a spreadsheet according to claim 1, characterized in that, the method further comprises the steps of:

obtaining touch and click information of only one touch point present on a touch screen;

determining target cells according to said touch and click information on the touch screen;

obtaining moving information about the touch point on the touch screen;

judging that an operation to be performed is an insertion operation or a deletion operation according to said moving information about the touch point on the touch screen and a preset logic for determining operation type; and determining locations and number of cells to be inserted or deleted according to a result of the judging step and a displacement of the touch point included in said moving information about the touch point on the touch screen, and performing said insertion or deletion operation.

* * * * *